US009825556B2

(12) United States Patent
Rodriguez

(10) Patent No.: US 9,825,556 B2
(45) Date of Patent: Nov. 21, 2017

(54) CONVERTER TOPOLOGIES FOR COMMON MODE VOLTAGE REDUCTION

(71) Applicant: SunPower Corporation, San Jose, CA (US)

(72) Inventor: Fernando Rodriguez, Austin, TX (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 15/080,142

(22) Filed: Mar. 24, 2016

(65) Prior Publication Data
US 2016/0285390 A1 Sep. 29, 2016

Related U.S. Application Data

(60) Provisional application No. 62/138,184, filed on Mar. 25, 2015.

(51) Int. Cl.
*H02M 7/797* (2006.01)
*H02J 7/34* (2006.01)
(Continued)

(52) U.S. Cl.
CPC .............. *H02M 7/797* (2013.01); *H02J 7/34* (2013.01); *H02M 1/12* (2013.01); *H02M 1/15* (2013.01);
(Continued)

(58) Field of Classification Search
CPC .. H02J 7/34; H02M 1/12; H02M 1/15; H02M 2001/007; H02M 2001/123; H02M 5/16;
(Continued)

(56) References Cited

U.S. PATENT DOCUMENTS 5,140,201 A    8/1992   Uenishi
8,279,642 B2  10/2012  Chapman et al.
(Continued)

OTHER PUBLICATIONS

International Search Report and Written Opinion for International Application No. PCT/US2016/024024, dated Jun. 24, 2016, 15 pages.
(Continued)

*Primary Examiner* — Adolf Berhane
*Assistant Examiner* — Bart Iliya

(57) ABSTRACT

An inverter includes a three-winding transformer, a DC-AC inverter electrically coupled to the first winding of the transformer, a cycloconverter electrically coupled to the second winding of the transformer, and an active filter electrically coupled to the third winding of the transformer. The DC-AC inverter is adapted to convert the input DC waveform to an AC waveform delivered to the transformer at the first winding. The cycloconverter is adapted to convert an AC waveform received at the second winding of the transformer to the output AC waveform having a grid frequency of the AC grid. The active filter is adapted to sink and source power with one or more energy storage devices based on a mismatch in power between the DC source and the AC grid. At least two of the DC-AC inverter, the cycloconverter, or the active filter are electrically coupled via a common reference electrical interconnect.

19 Claims, 11 Drawing Sheets

(51) Int. Cl.
    *H02M 1/12* (2006.01)
    *H02M 1/15* (2006.01)
    *H02M 5/16* (2006.01)
    *H02M 5/458* (2006.01)
    *H02M 7/48* (2007.01)
    *H02M 7/5387* (2007.01)
    *H02M 7/493* (2007.01)
    *H02M 1/00* (2006.01)

(52) U.S. Cl.
    CPC ............ *H02M 5/16* (2013.01); *H02M 5/458* (2013.01); *H02M 7/4807* (2013.01); *H02M 7/493* (2013.01); *H02M 7/5387* (2013.01); *H02M 2001/007* (2013.01); *H02M 2001/123* (2013.01); *Y02B 70/1441* (2013.01)

(58) Field of Classification Search
    CPC .... H02M 5/458; H02M 7/4807; H02M 7/493; H02M 7/5387; H02M 7/797
    See application file for complete search history.

(56) References Cited

U.S. PATENT DOCUMENTS

| | | |
|---|---|---|
| 2005/0116767 A1 | 6/2005 | Cavazzoni |
| 2006/0256470 A1 | 11/2006 | Juds et al. |
| 2008/0055954 A1 | 3/2008 | Kajouke et al. |
| 2011/0026282 A1 | 2/2011 | Chapman et al. |
| 2011/0181128 A1 | 7/2011 | Perreault et al. |
| 2012/0098344 A1 | 4/2012 | Bergveld et al. |
| 2012/0275201 A1* | 11/2012 | Koyama ............... H02M 1/126 363/40 |
| 2014/0268908 A1* | 9/2014 | Zhou ................... H02M 7/5381 363/21.03 |
| 2014/0300206 A1 | 10/2014 | Moes et al. |
| 2016/0268917 A1* | 9/2016 | Ramsay ................ H02M 5/458 |

OTHER PUBLICATIONS

International Search Report and Written Opinion for International Application No. PCT/US2016/024026, dated Jun. 24, 2016, 14 pages.

Krishnaswami et al., "Three-Port Series-Resonanr DC-DC Converter to Interface Renewable Energy Sources With Bidirectional Load and Energy Storage Ports", IEEE Transactions on Power Electronics, vol. 24, No. 10, Oct. 2009, pp. 2289-2297.

Brandon J. Pierquet, "Designs for Ultra-High Efficiency Grid-Connected Power Conversion", Massachusetts Institute of Technology, Thesis, Jun. 2011, 215 pages.

* cited by examiner

CONVERTER TOPOLOGIES FOR COMMON MODE VOLTAGE REDUCTION

CROSS-REFERENCE TO RELATED U.S. PATENT APPLICATION

The present application claims priority under 35 U.S.C. §119(e) to U.S. Provisional Patent Application Ser. No. 62/138,184, entitled "DC-TO-AC INVERTER TOPOLOGIES" by Patrick Chapman, which was filed on Mar. 25, 2015, the entirety of which is hereby incorporated by reference.

GOVERNMENT RIGHTS

This invention was made in part with government support under Grant No. DE-EE0005341 awarded by the Department of Energy. The Government has certain rights in this invention.

TECHNICAL FIELD

The present disclosure relates, generally, to power converters for converting direct current (DC) power to alternating current (AC) power and, more particularly, to converter topologies for reducing common mode voltage.

BACKGROUND

Power inverters convert a DC power to an AC power. For example, some power inverters are configured to convert the DC power to an AC power suitable for supplying energy to an AC grid and, in some cases, an AC load that may or may not be coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency. The amount of power that can be delivered by certain alternative energy sources, such as PV cells, may vary in magnitude over time due to temporal variations in operating conditions. For example, the output of a typical PV cell will vary as a function of variations in sunlight intensity, angle of incidence of sunlight, ambient temperature and other factors.

In a typical photovoltaic power system, an inverter may be associated with one or more solar cell panels. For example, some systems include strings of solar cell panels that deliver a relatively high, combined voltage (e.g., nominal 450 V) to a single, large inverter. Alternatively, in other systems such as a distributed photovoltaic power system, an inverter may be associated with each solar cell panel. In such systems, the solar cell panels are typically small, relatively low voltage (e.g., 25 V). The inverter may be placed in close proximity to the associated solar cell panel to increase the conversion efficiency of the overall system.

SUMMARY

According to one aspect, an inverter for converting an input direct current (DC) waveform from a DC source to an output alternating current (AC) waveform for delivery to an AC grid may include a three-winding transformer that includes a first winding, a second winding, and a third winding. The inverter may further include a DC-AC inverter electrically coupled to the first winding of the transformer, a cycloconverter electrically coupled to the second winding of the transformer, and an active filter electrically coupled to the third winding of the transformer. The DC-AC inverter may be adapted to convert the input DC waveform to an AC waveform delivered to the transformer at the first winding. The cycloconverter may be adapted to convert an AC waveform received at the second winding of the transformer to the output AC waveform having a grid frequency of the AC grid. The active filter may be adapted to sink and source power with one or more energy storage devices based on a mismatch in power between the DC source and the AC grid. Further, at least two of the DC-AC inverter, the cycloconverter, or the active filter may be electrically coupled via a common reference electrical interconnect.

In some embodiments, each of the DC-AC inverter, the cycloconverter, and the active filter may be electrically coupled to the common reference electrical interconnect. Further, the DC-AC inverter may comprise a half-bridge inverter circuit and a capacitor divider electrically coupled with the half-bridge inverter circuit. In such embodiments, the first winding may include a first terminal and a second terminal, the half-bridge inverter circuit may include a first electrical switch electrically coupled to a second electrical switch at a first node, the capacitor divider may include a first capacitor electrically coupled to a second capacitor and the first terminal at a second node, and/or the DC-AC inverter may include an inductor electrically coupled in series to the second terminal and the first node. Further, the DC-AC inverter may be electrically coupled to the common reference electrical interconnect at the second node.

In some embodiments, the cycloconverter may include a set of electrical switches and a capacitor divider electrically coupled with the set of electrical switches. Further, the second winding may include a first terminal and a second terminal, the set of electrical switches may include a first subset of electrical switches electrically coupled to a second subset of electrical switches at a first node, the capacitor divider may include a first capacitor electrically coupled to a second capacitor and the first terminal at a second node, and/or the cycloconverter may include an inductor electrically coupled in series to the second terminal and the first node. In some embodiments, the cycloconverter may be electrically coupled to the common reference electrical interconnect at the second node. Further, each of the first subset of electrical switches and the second subset of electrical switches may consist of a pair of blocking switches electrically coupled in series.

In some embodiments, the active filter may include at least one energy storage device, a half-bridge switching circuit, and a capacitor divider electrically coupled to the at least one energy storage device and the half-bridge switching circuit. Further, the third winding may include a first terminal and a second terminal, the half-bridge switching circuit may include a first electrical switch electrically coupled to a second electrical switch and the first terminal at a first node, and/or the capacitor divider may include a first capacitor electrically coupled to a second capacitor and the second terminal at a second node. In some embodiments, the active filter may be electrically coupled to the common reference electrical interconnect at the second node.

According to another aspect, an inverter for converting an input direct current (DC) waveform from a DC source to an output alternating current (AC) waveform for delivery to an AC grid may include a transformer that includes a first winding and a second winding, a DC-AC inverter electrically coupled to the first winding of the transformer, a cycloconverter electrically coupled to the second winding of the transformer via a first connection and to the DC-AC inverter via a common reference electrical interconnect, and an active filter electrically coupled to the second winding of the transformer. The DC-AC inverter may be adapted to convert the DC waveform to an AC waveform delivered to the transformer at the first winding. The cycloconverter may be adapted to convert an AC waveform received at the second winding of the transformer to the output AC waveform having a grid frequency of the AC grid. The active filter may be adapted to sink and source power with one or more energy storage devices based on a mismatch in power between the DC source and the AC grid.

In some embodiments, the cycloconverter may include a set of electrical switches and a capacitor divider electrically coupled with the set of electrical switches. Further, the second winding may include a first terminal and a second terminal, the set of electrical switches may include a first subset of electrical switches electrically coupled to a second subset of electrical switches at a first node, the capacitor divider may include a first capacitor electrically coupled to a second capacitor and the first terminal at a second node, and/or the cycloconverter may include an inductor electrically coupled in series to the second terminal and the first node. In some embodiments, the active filter may include at least one energy storage device, a half-bridge switching circuit, and a second capacitor divider electrically coupled to the at least one energy storage device and the half-bridge switching circuit. Further, the half-bridge switching circuit may include a first electrical switch and a second electrical switch electrically coupled to the inductor and the second terminal at a common node, and/or the second capacitor divider may include a third capacitor and a fourth capacitor electrically coupled to the first terminal at the second node.

According to yet another aspect, an inverter for converting an input direct current (DC) waveform from a DC source to an output alternating current (AC) waveform for delivery to an AC grid may include a controller having a processor and a memory, a transformer that includes a first winding and a second winding, a DC-AC inverter electrically coupled to the first winding of the transformer, a cycloconverter electrically coupled to the second winding of the transformer and to the DC-AC inverter via a common reference electrical interconnect, and an active filter electrically coupled to the second winding of the transformer and comprising a plurality of electrical switches and one or more energy storage devices. The DC-AC inverter may be adapted to converter the DC waveform to an AC waveform delivered to the transformer at the first winding. The cycloconverter may be adapted to convert an AC waveform received at the second winding of the transformer to the output AC waveform having a grid frequency of the AC grid. The controller may be adapted to control the switching cycles of the plurality of electrical switches of the active filter to sink and source power with the one or more energy storage devices based on a mismatch in power between the DC source and the AC grid.

In some embodiments, the controller may be adapted to control the switching cycles of the plurality of electrical switches using zero-voltage switching. Further, in some embodiments, the DC source may include a photovoltaic module.

DETAILED DESCRIPTION

Figure 1:
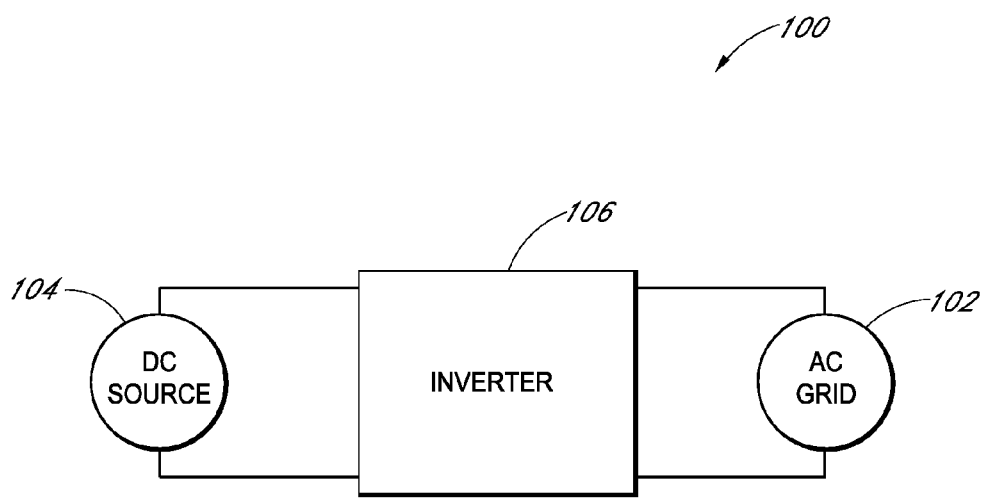
FIG. 1 is a simplified block diagram of one embodiment of a system for converting DC power to AC power.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

It should be appreciated that common mode voltage in power electronic circuits causes electrically conducted and radiated noise, which may be detrimental to the operation of the circuits. As such, substantial efforts are typically endured in order to minimize or reduce common mode voltage and/or meet associated regulatory requirements. The various circuit topologies described herein reduce the common mode voltage in a multi-port resonant converter. For example, in illustrative embodiments, common mode voltage due to semiconductor switching may be eliminated or reduced. Such reductions may be beneficial as the common mode voltage transition rate (dv/dt) due to semiconductor switching is often at least an order of magnitude larger than the dv/dt of a sinusoid at the switching frequency.

Referring to FIG. 1, a system 100 for supplying alternating current (hereinafter "AC") power to an AC grid 102 at a grid frequency includes a direct current (hereinafter "DC") source 104 and an inverter 106. The DC source 104 may be embodied as any type of DC source configured to generate or produce a DC power, which is supplied to the inverter 106. For example, the DC power may be embodied as a photovoltaic solar cell or array, a fuel cell, a wind turbine configured to generate a DC power (e.g., via a rectifying circuit), a water turbine configured to generate a DC power, or other unipolar power source.

The inverter 106 is electrically connected to the DC source 104 and configured to convert a DC waveform generated by the DC source 104 to an AC waveform suitable for delivery to the AC grid 102 and, in some embodiments, loads coupled to the AC grid 102. The AC grid 102 may be embodied as, for example, a utility power grid that supplies utility AC power to residential and commercial users. Such utility power grids may be characterized as having an essentially sinusoidal bipolar voltage at a fixed grid frequency (e.g., $f=\omega=2\pi=50$ Hz or 60 Hz).

Figure 2:
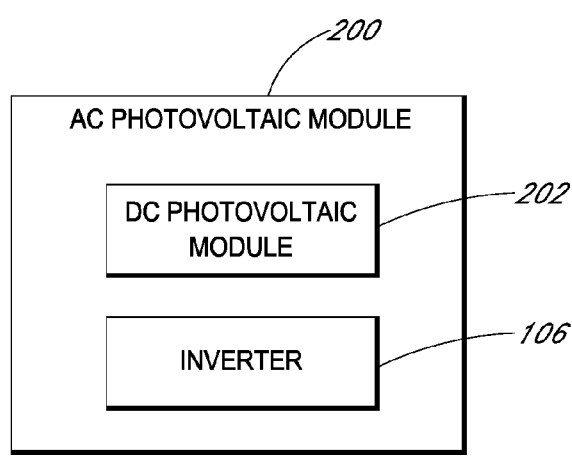
FIG. 2 is a simplified block diagram of one embodiment of an AC photovoltaic module of the system of FIG. 1.

As discussed above, in some embodiments, the DC source 104 may be embodied as one or more photovoltaic cells. In such embodiments, the DC source 104 and the inverter 106 may be associated with each other to embody an AC photovoltaic module (ACPV) 200 as illustrated in FIG. 2. The ACPV 200 includes a DC photovoltaic module (DCPV) 202, which operates as the DC source 104, electrically coupled to the inverter 106. The DCPV 202 includes one or more photovoltaic cells and is configured to deliver a DC waveform to the inverter 106 in response to receiving an amount of sunlight. The DC power delivered by the ACPV 200 is a function of environmental variables, such as, e.g., sunlight intensity, sunlight angle of incidence and temperature. In some embodiments, the inverter 106 is positioned in a housing of the ACPV 200. Alternatively, the inverter 106 may include its own housing secured to the housing of the ACPV 200. Additionally, in some embodiments, the inverter 106 is separate from the housing, but located near the DCPV 202. As discussed above, the inverter 106 is configured to convert the DC power received from the DCPV 202 to an AC power suitable for delivery to the AC grid 102 at the grid frequency. It should be appreciated that multiple ACPVs 200 may be used to form a solar array with each ACPV 200 having a dedicated inverter 106.

Figure 3:
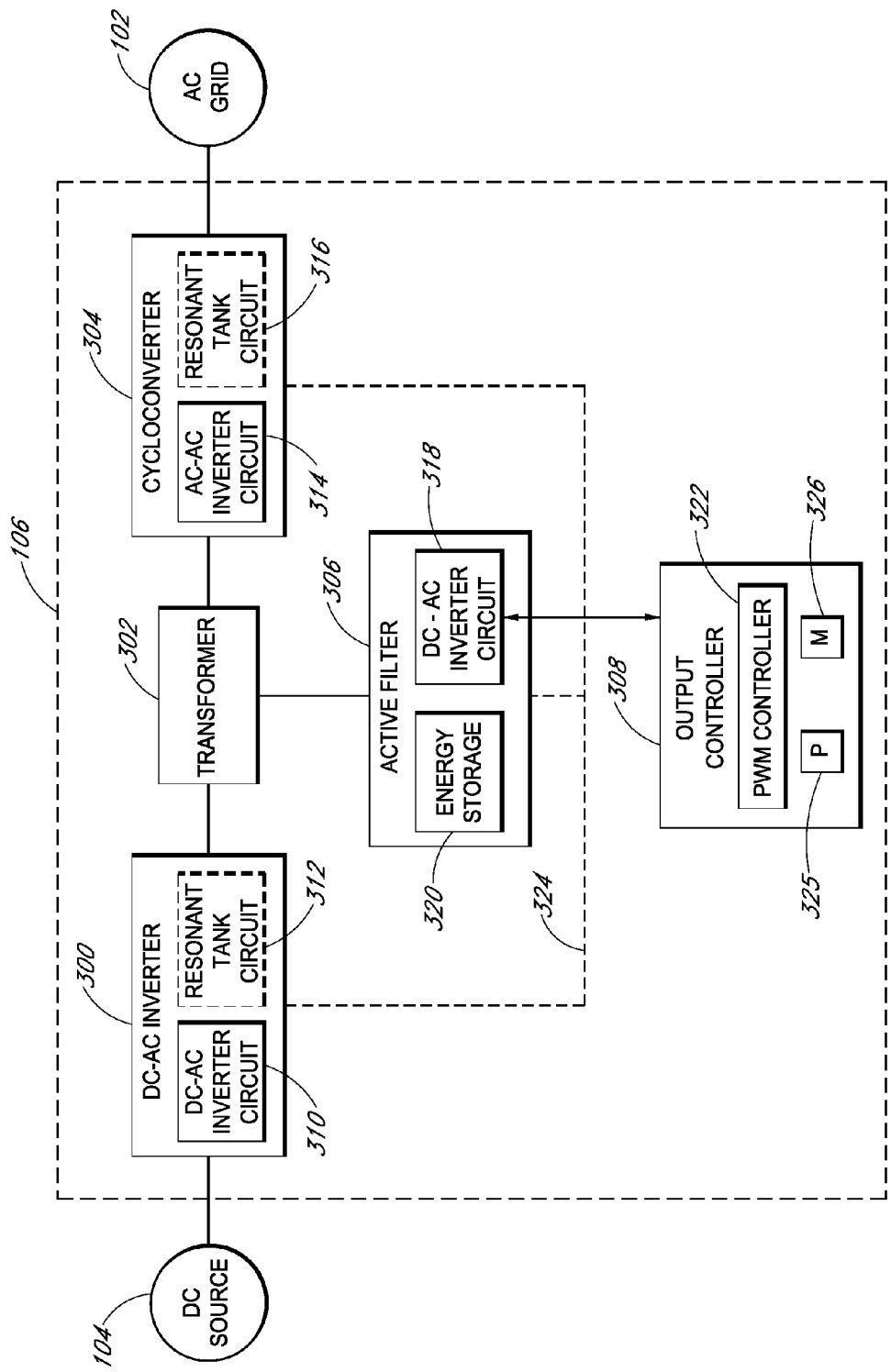
FIG. 3 is a simplified block diagram of one embodiment of an inverter of the system of FIG. 1.

Referring now to FIG. 3, in some embodiments, the inverter 106 includes a DC-AC inverter 300, a transformer 302, a cycloconverter 304, and an active filter 306. Depending on the particular embodiment, the transformer 302 may be embodied as a three-winding transformer that includes a first winding, a second winding, and a third winding (see, for example, FIGS. 4-6) or a two-winding transformer that includes a first winding and a second winding (see, for example, FIGS. 7-12). Although the transformer 302 may be described herein as a two-winding transformer or a three-winding transformer, it should be appreciated that such transformers may include more than two or three windings, respectively, in some embodiments. For example, in various embodiments, a three-winding transformer may include three windings, four windings, five windings, or a greater number of windings.

The DC-AC inverter 300 is electrically coupled to the first winding (not shown) of the transformer 302 and is electrically couplable to the DC source 104. As shown in FIG. 3, the DC-AC inverter 300 includes a DC-AC inverter circuit 310 and, in some embodiments, may include a resonant tank circuit 312 or a portion thereof. The DC-AC inverter circuit 310 is adapted to convert an input DC waveform from the DC source 14 to an AC waveform delivered to the transformer 302 at the first winding. In some embodiments, the resonant tank circuit 312 includes a capacitor and an inductor. It should be appreciated that, in some embodiments, the resonant tank circuit 312 may be formed by one or more discrete capacitors (e.g., a capacitor divider) and a leakage inductance of the transformer 302 (see, for example, FIG. 7).

The cycloconverter 304 is electrically coupled to the second winding (not shown) of the transformer 302 and electrically couplable to the AC grid 102. As shown in FIG. 3, the cycloconverter 304 includes an AC-AC converter circuit 314 and, in some embodiments, may include a resonant tank circuit 316 (e.g., a capacitor and inductor). The AC-AC converter circuit 314 is adapted to convert an AC waveform received at the second winding of the transformer 302 to the output AC waveform delivered to the AC grid 102 and having the same frequency as a waveform of the AC grid 102 (i.e., the grid frequency). That is, the cycloconverter 304 is configured to convert an input AC waveform to an output AC waveform having a frequency that is different from the input AC waveform.

Depending on the particular embodiment, the active filter 306 may be coupled to the second winding or the third winding (not shown) of the transformer 302. For example, in embodiments in which the transformer 302 is embodied as a three-winding transformer, the active filter 306 may be electrically coupled to the third winding of the transformer 302, whereas in embodiments in which the transformer 302 is embodied as a two-winding transformer, the active filter 306 may be electrically coupled to the second winding of the transformer 302. The active filter 306 is adapted to sink and source power with one or more energy storage devices 320 of the active filter 306 and using a DC-AC inverter circuit 318 based on a mismatch (e.g., an instantaneous mismatch) in power between the DC source 104 and the AC grid 102. That is, the active filter 306 supplies power from or absorbs power with the one or more energy storage devices 320 based on the mismatch in power.

For example, it should be appreciated that the DC source 104 delivers a relatively constant power to the DC-AC inverter 300. However, the AC grid 102 has a relatively sinusoidal power that fluctuates (e.g., between zero and peak power). When the power of the AC grid 102 is zero, the power delivered to the AC grid 102 should also be zero; accordingly, the constant power delivered by the DC source 104 is supplied to the one or more energy storage devices 320 of the active filter 306. However, when the AC grid 102 is at peak power, the power of the AC grid 102 is generally twice that of the input power from the DC source 104; as such, all of the power from the DC source 104 is delivered to the AC grid 102 and the other half of the power is supplied from the one or more energy storage devices 320 of the active filter 306. In some embodiments, the one or more energy storage devices 320 are embodied as one or more capacitors; however, the energy storage devices 320 may be embodied as other devices in other embodiments.

As shown in FIG. 3, at least two of the DC-AC inverter 300, the cycloconverter 304, and/or the active filter 306 are electrically coupled with one another via a common reference electrical interconnect 324 (e.g., via one or more electrically conductive connections). For example, in some embodiments, each of the DC-AC inverter 300, the cycloconverter 304, and the active filter 306 is electrically coupled to the common reference electrical interconnect 324. In other embodiments, the DC-AC inverter 300 may be electrically coupled to the cycloconverter 304 via the common reference electrical interconnect 324 to which the active filter 306 is not electrically coupled. In use, the common reference electrical interconnect 324 may function to limit the common mode voltage to a sinusoidal voltage with a frequency equal to that of the switching frequency. Depending on the particular embodiment, the common reference electrical interconnect 324 may be embodied as any one or more electrically conductive wires, traces, or other suitable conductive elements. In some embodiments, it should be appreciated that the common reference electrical interconnect 324 has zero or negligible impedance relative to other circuit elements of the inverter 106.

The inverter 106 also includes an inverter controller 310, which controls the operation of the DC-AC inverter 300, the cycloconverter 304, and the active filter 306. Although the inverter controller 308 is illustratively embodied as a single controller in the embodiment of FIG. 3, the inverter controller 308 may be embodied as multiple separate controllers in other embodiments. For example, in some embodiments, the inverter 106 may include an input controller to control the operation of the DC-AC inverter 300, an output controller to control the operation of the cycloconverter 304, and/or a filter controller to control the operation of the active filter 306. In such embodiments, each of the controllers may be galvanically isolated from one another.

As discussed above, the inverter controller 308 is electrically coupled to and adapted to control operation of the DC-AC inverter 300, the cycloconverter 304, and the active filter 306. To do so, the inverter controller 308 may provide a plurality of switching and/or control signals to various circuits of the DC-AC inverter 300, the cycloconverter 304, and the active filter 306. For example, in some embodiments, the inverter controller 308 controls the operation of the DC-AC inverter 300 based on a global maximum power point tracking ("MPPT") method. As shown in FIG. 3, the illustrative inverter controller 308 includes a pulse width modulation ("PWM") controller 322 that utilizes a PWM algorithm to control various switches of the inverter 106 described in greater detail below. To do so, the PWM controller 322 may provide a plurality of switching and/or control signals to various circuits of the inverter 106. It should be appreciated that, in some embodiments, the inverter controller 308 is adapted to control switching cycles of the various electrical switches of the DC-AC inverter 300, the cycloconverter 304, and/or the active filter 306 using zero-voltage switching techniques.

The inverter controller 308 may include a processor 325 and a memory 326, both of which may be integrated into a single integrated circuit or as separate integrated circuits connected via wires on a printed circuit board. The processor 325 may execute instructions stored on the memory 326 and cause the inverter controller 308 to perform various actions to control the DC-AC inverter 300, the cycloconverter 304, and/or the active filter 306. The memory 326 may be any of a number of known tangible storage mediums (e.g., RAM, DRAM, SRAM, ROM, EEPROM, Flash memory, etc.).

Additionally, in some embodiments, the inverter 106 may include circuits not shown herein for clarity of the description. For example, the inverter 106 may include communication circuitry, which may be communicatively coupled to the inverter controller 308 or may be incorporated therein. In such embodiments, the inverter controller 308 may utilize the communication circuitry to communicate with remote devices, such as remote controllers or servers. For example, depending on the particular embodiment, the communication circuitry may be configured to communicate with remote devices over an AC power line, such as the AC power line interconnects coupled to the output of the cycloconverter 304, or using other communication technologies and/or protocols. For example, in some embodiments, the communication circuitry may be embodied as a wireless or wired communication circuit configured to communicate with remote devices utilizing one or more wireless or wired communication technologies and/or protocols such as Wi-Fi™, Zigbee®, ModBus®, WiMAX, Wireless USB, Bluetooth®, TCP/IP, USB, CAN-bus, HomePNA™, and/or other wired or wireless communication technology and/or protocol. Further, in some embodiments, the inverter 106 may include an input filter electrically coupled (e.g., in series) with the DC source 104 and/or an output filter electrically coupled (e.g., in series) with the AC grid 102.

Figure 4:
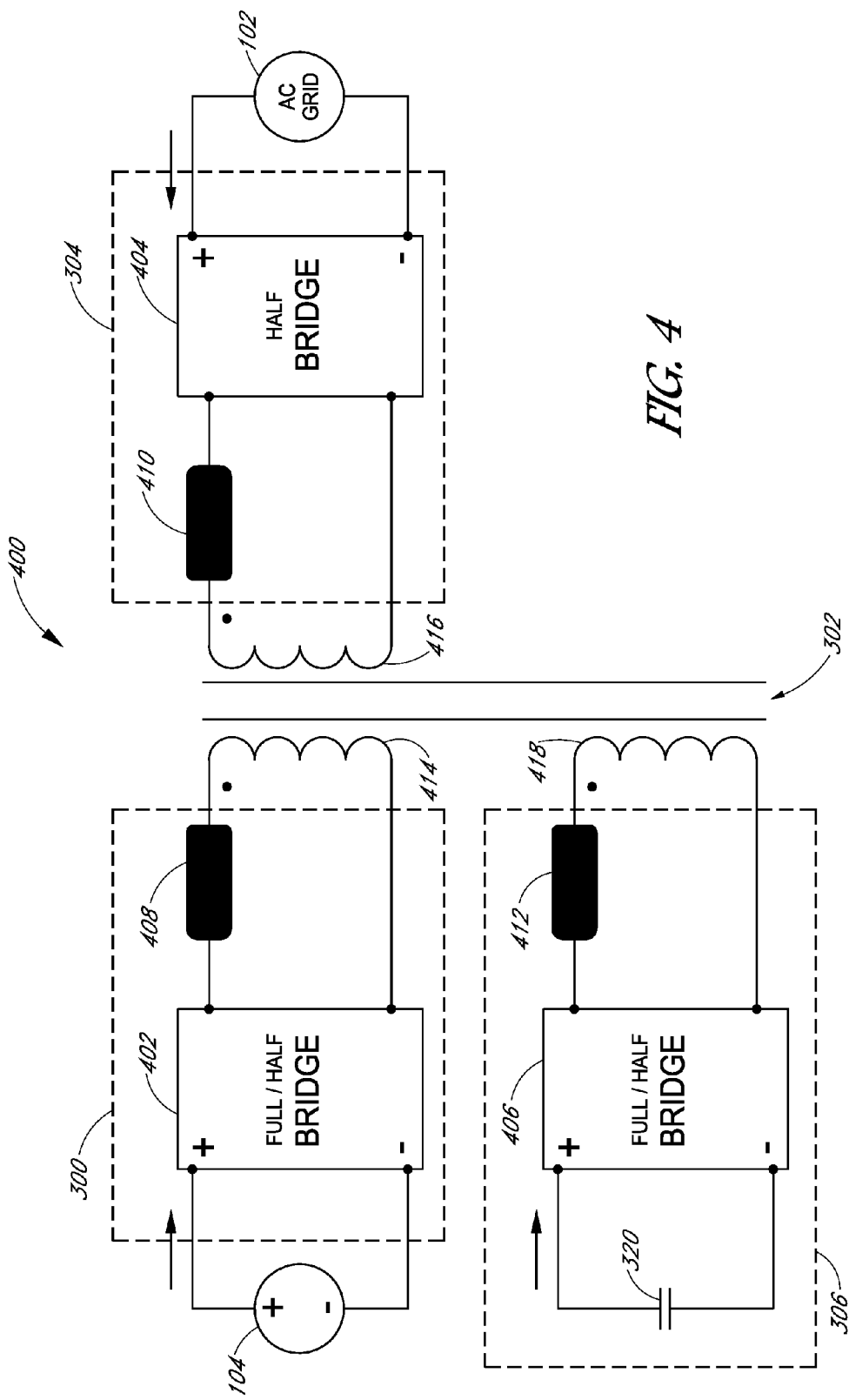
FIGS. 4-12 are simplified electrical schematics of various embodiments of the inverter of FIG. 3.

Referring now to FIG. 4, a multi-port resonant converter topology in which the inverter 106 is embodied as a three-port inverter 400 and includes a three-winding transformer 302 is shown. The illustrative inverter 400 of FIG. 4 includes a set of full and/or half bridge converter circuits 402, 404, 406 and a set of impedances 408, 410, 412. As shown, in the illustrative embodiment, the converter circuit 402 and the impedance 408 form the DC-AC inverter 300, the converter circuit 404 and the impedance 410 form the cycloconverter 304, and the converter circuit 406, the impedance 412, and the energy storage device 320 (illustratively shown as a capacitor) form the active filter 306. As shown and described above, the DC-AC inverter 300 is electrically coupled to a first winding 414 of the transformer 302, the cycloconverter 304 is electrically coupled to a second winding 416 of the transformer 302, and the active filter 306 is electrically coupled to a third winding 418 of the transformer 302.

Figure 5:
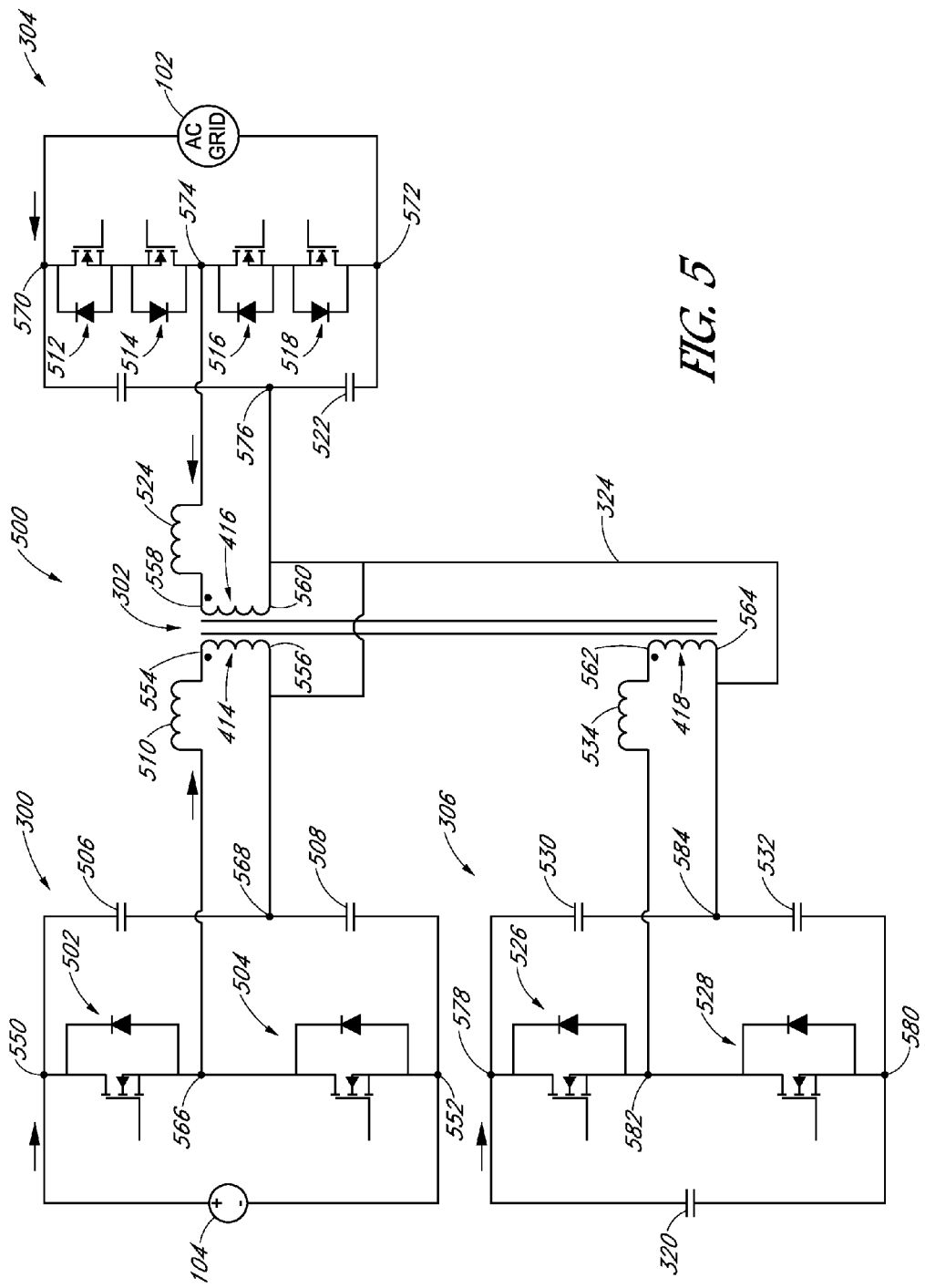
Figure 6:
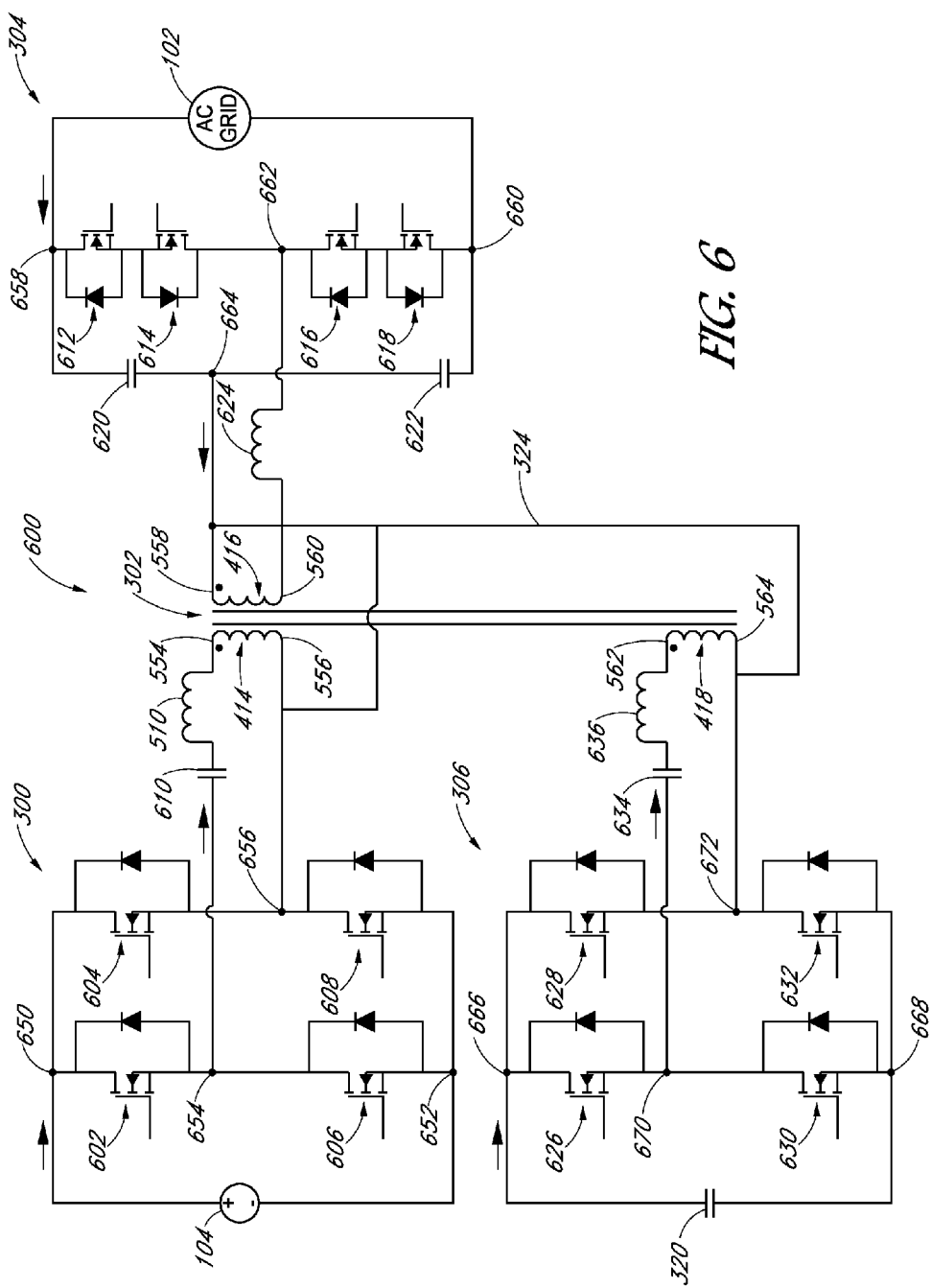

The converter circuit 402 is embodied as the DC-AC inverter circuit 310 and, depending on the particular embodiment, may be embodied as a half-bridge inverter circuit (see, for example, FIG. 5) or a full-bridge inverter circuit (see, for example, FIG. 6). Similarly, the converter circuit 406 is embodied as the DC-AC inverter circuit 318, which depending on the particular embodiment, may be embodied as a half-bridge inverter circuit or a full-bridge inverter circuit. The illustrative converter circuit 404 is embodied as the AC-AC converter circuit 314 in a half-bridge configuration. The impedances 408, 410 may be a result of, or otherwise be associated with, a portion of the resonant tank circuits 312, 314, respectively. As such, each of the impedances 408, 410 may represent a capacitance and inductance in the corresponding resonant tank circuits 312, 314. The illustrative impedance 412 is representative of a leakage inductance from the three-winding transformer 302.

Referring now to FIGS. 5-6, in some embodiments, the inverter 106 may be embodied as a three-port inverter 500, 600 having a three-winding transformer 302. As shown in FIG. 5, each of the DC-AC inverter 300, the cycloconverter 304, and the active filter 306 of the inverter 500 illustratively includes a half-bridge converter. In the illustrative embodiment, the DC-AC inverter 300 includes electrical switches 502, 504, capacitors 506, 508, and an inductor 510. The illustrative cycloconverter 304 includes electrical switches 512, 514, 516, 518, capacitors 520, 522, and an inductor 524. Further, the illustrative active filter 306 includes electrical switches 526, 528, capacitors 530, 532 and, in some embodiments, an inductance 534. The active filter 306 further includes the one or more energy storage devices 320, which is illustrated in FIG. 5 as a capacitor. As described above, the DC-AC inverter 300 is electrically coupled to the first winding 414 of the transformer 302 (at terminals 554, 556), the cycloconverter 304 is electrically coupled to the second winding 416 of the transformer 302 (at terminals 558, 560), and the active filter 306 is electrically coupled to the third winding 418 of the transformer 302 (at terminals 562, 564).

The illustrative inverter 500 is electrically coupled to the DC source 104, which is embodied as one or more photovoltaic cells, at nodes or electrical connections 550, 552. In particular, the DC-AC inverter circuit 310 illustratively including a pair of electrical switches 502, 504 and a capacitor divider including the capacitors 506, 508, is electrically coupled to the DC source 104 at the electrical connections 550, 552. More specifically, the electrical switch 502 and the capacitor 506 are electrically coupled to the DC source 104 at the electrical connection 550, and the electrical switch 504 and the capacitor 508 are electrically coupled to the DC source 104 at the electrical connection 552. Further, the electrical switches 502, 504 are electrically coupled to one another and to the inductor 510 at an electrical connection 566, and the capacitors 506, 508 are electrically coupled to one another and to the terminal 556 of the first winding 414 of the transformer 302 at the electrical connection 568. The inductor 510 is further electrically coupled to the terminal 554 of the first winding 414 of the transformer 302.

Additionally, the illustrative inverter 500 is electrically coupled to the AC grid 102 at electrical connections 570, 572. In particular, the cycloconverter 304, which illustratively includes a set of electrical switches 512, 514, 516, 518 and a capacitor divider including the capacitors 520, 522, is electrically coupled to the AC grid at the electrical connections 570, 572. More specifically, a pair of the electrical switches 512, 514 and the capacitor 520 are electrically coupled to the AC grid 102 at the electrical connection 570, and a pair of the electrical switches 516, 518 and the capacitor 522 are electrically coupled to the AC grid 102 at the electrically connection 572. It should be appreciated that each of those pairs of electrical switches is configured with the electrical switches electrically coupled "back-to-back" in series in opposing "directions" to operate, for example, as blocking switches depending on whether the power grid waveform is positive or negative at a given point in time. As shown, the electrical switches 514, 516 are electrically coupled to one another and to the inductor 524 at an electrical connection 574, and the capacitors 520, 522 are electrically coupled to one another and to the terminal 560 of the second winding 416 of the transformer 302 at the electrical connection 576. The inductor 524 is further electrically coupled to the terminal 558 of the second winding 416 of the transformer 302.

As shown in FIG. 5, the active filter 306 is electrically coupled to the third winding 418 of the transformer 302. In particular, the DC-AC inverter circuit 318 illustratively including a pair of electrical switches 526, 528 and a capacitor divider including the capacitors 530, 532 is electrically coupled to the at least one energy storage devices 320 (represented as a capacitor) at the electrical connections 578, 580. More specifically, the electrical switch 526 and the capacitor 530 are electrically coupled to the energy storage device 320 at the electrical connection 578, and the electrical switch 528 and the capacitor 532 are electrically coupled to the energy storage device 320 at the electrical connection 580. Further, the electrical switches 526, 528 are electrically coupled to one another and to a terminal 562 of the third winding 418 of the transformer 302 at the electrical connection 582, and the capacitors 530, 532 are electrically coupled to one another and to a terminal 564 of the third winding 418 of the transformer 302 at the electrical connection 584. Although the inductance 534 is represented in series between the electrical connection 582 and the terminal 562 in FIG. 5, it should be appreciated that the inductance 534 is a leakage inductance from the transformer 302 and, therefore, not a discrete inductor. However, the inductance 534 may alternatively, or additionally, be a result of a discrete inductor in other embodiments.

It should be appreciated that the power transfer may be achieved among the three ports of the inverter 106 (i.e., the DC-AC inverter 300, the cycloconverter 304, and/or the active filter 306) by varying the phase angle of a particular port using pulse width modulation. However, the use of such techniques results in a common mode voltage, for example, when the semiconductors switch. For example, when the active filter 306 switches, the input and output connections in that port are flipped, which may result in a common mode voltage. As described above, the inverter 106 includes a common reference electrical interconnect 324, which functions to limit the common mode voltage to a sinusoidal voltage with a frequency equal to that of the switching frequency. In the illustrative embodiment of FIG. 5, the common reference electrical interconnect 324 is electrically coupled to each of the electrical connections 568, 576, 584 such that those connections 568, 576, 584 function as the same node or electrical connection. In other words, in the illustrative embodiment, the capacitive legs of the three ports are tied together, which causes the resulting common mode voltage to be sinusoidal, which may be easier to manage. In other embodiments, the common reference electrical interconnect 324 may be electrically coupled to only two of the electrical connections 568, 576, 584.

Referring now to FIG. 6, it should be appreciated that the three-port inverter 600 of FIG. 6 is similar to the inverter 500 of FIG. 5; however, the DC-AC inverter circuits 310, 318 are embodied as full-bridge converter circuits in the embodiment of FIG. 6. As shown, the illustrative DC-AC inverter 300 includes electrical switches 602, 604, 606, 608, a capacitor 610, and the inductor 510. Further, the illustrative cycloconverter 304 includes electrical switches 612, 614, 616, 618, capacitors 620, 622, and an inductor 624. The illustrative active filter 306 includes electrical switches 626, 628, 630, 632, a capacitor 634, and an inductance 636. The active filter 306 further includes the one or more energy storage devices 320, which is illustrated in FIG. 6 as a capacitor.

The illustrative inverter 600 is electrically coupled to the DC source 104 at electrical connections 650, 652. More specifically, the electrical switches 602, 604 are electrically coupled to the DC source 104 at the electrical connection 650, and the electrical switches 606, 608 are electrically coupled to the DC source 104 at the electrical connection 652. Further, the electrical switches 602, 606 are electrically coupled to one another and to the capacitor 610 at the electrical connection 654, and the electrical switches 604, 608 are electrically coupled to one another and to the terminal 556 of the transformer 302 at the electrical connection 656. Additionally, the capacitor 510 is electrically coupled to the capacitor 610 and to the terminal 554 of the transformer 302 such that the capacitor 610 and the inductor 510 are electrically wired in series between the electrical connection 654 and the terminal 554.

The inverter 600 is electrically coupled to the AC grid 102 at electrical connections 658, 660. More specifically, a pair of the electrical switches 612, 614 and the capacitor 620 are electrically coupled to the AC grid 102 at the electrical connection 658, and a pair of the electrical switches 616, 618 and the capacitor 622 are electrically coupled to the AC grid 102 at the electrically connection 660. It should be appreciated that each of those pairs of electrical switches is configured with the electrical switches electrically coupled "back-to-back" in series in opposing "directions" to operate, for example, as blocking switches depending on whether the power grid waveform is positive or negative at a given point in time. As shown, the electrical switches 614, 616 are electrically coupled to one another and to the inductor 624 at the electrical connection 662, and the capacitors 620, 622 are electrically coupled to one another and to the terminal 558 of the second winding 416 of the transformer 302 at the electrical connection 664. The inductor 664 is further electrically coupled to the terminal 560 of the transformer 302.

The active filter 306 is electrically coupled to the third winding 418 of the transformer 302. More specifically, the electrical switches 626, 628 are electrically coupled to the at least one energy storage device 320 (represented as a capacitor) at the electrical connection 666, and the electrical switches 630, 632 are electrically coupled to the energy storage device 320 at the electrical connection 668. Further, the electrical switches 626, 630 are electrically coupled to one another and to the capacitor 634 at the electrical connection 670, and the electrical switches 628, 632 are electrically coupled to one another and to the terminal 564 of the transformer 302 at the electrical connection 672. In use, the capacitor 634 may have a relatively large capacitance and/or more operate as a DC blocking capacitor, for example, to maintain a DC current offset of zero. The capacitor 634 is also electrically coupled to the terminal 562 of the transformer 302. Although the inductance 636 is illustrated in series with the capacitor 634 between the electrical connection 670 and the terminal 562 in FIG. 6, it should be appreciated that the inductance 636 is a leakage inductance from the transformer 302 and, therefore, not a discrete inductor. However, the inductance 636 may alternatively, or additionally, be a result of a discrete inductor in other embodiments.

As shown, the illustrative inverter 600 of FIG. 6 includes a common reference electrical interconnect 324 that is electrically coupled to each of the electrical connections 656, 664, 672 such that those connections 656, 664, 672 function as the same node or electrical connection. In other embodiments, the common reference electrical interconnect 324 may be electrically coupled to only two of the electrical connections 656, 664, 672.

Referring now to FIGS. 7-12, the inverter 106 may be embodied as a three-port inverter 700, 800, 900, 1000, 1100, 1200 having a two-winding transformer 302. In particular, the inverters 700, 800, 900 illustrate such inverters that utilize half-bridge converter circuits, whereas the inverters 1000, 1100, 1200 illustrate such inverters that utilize full-bridge converter circuits. In particular, the DC-AC inverter 300, the cycloconverter 304, and the active filter 306 of each of the inverters 700, 800, 900 includes a half-bridge converter circuit, whereas the DC-AC inverter 300 and the active filter 306 of each of the inverters 1000, 1100, 1200 includes a full-bridge converter circuit.

Figure 7:
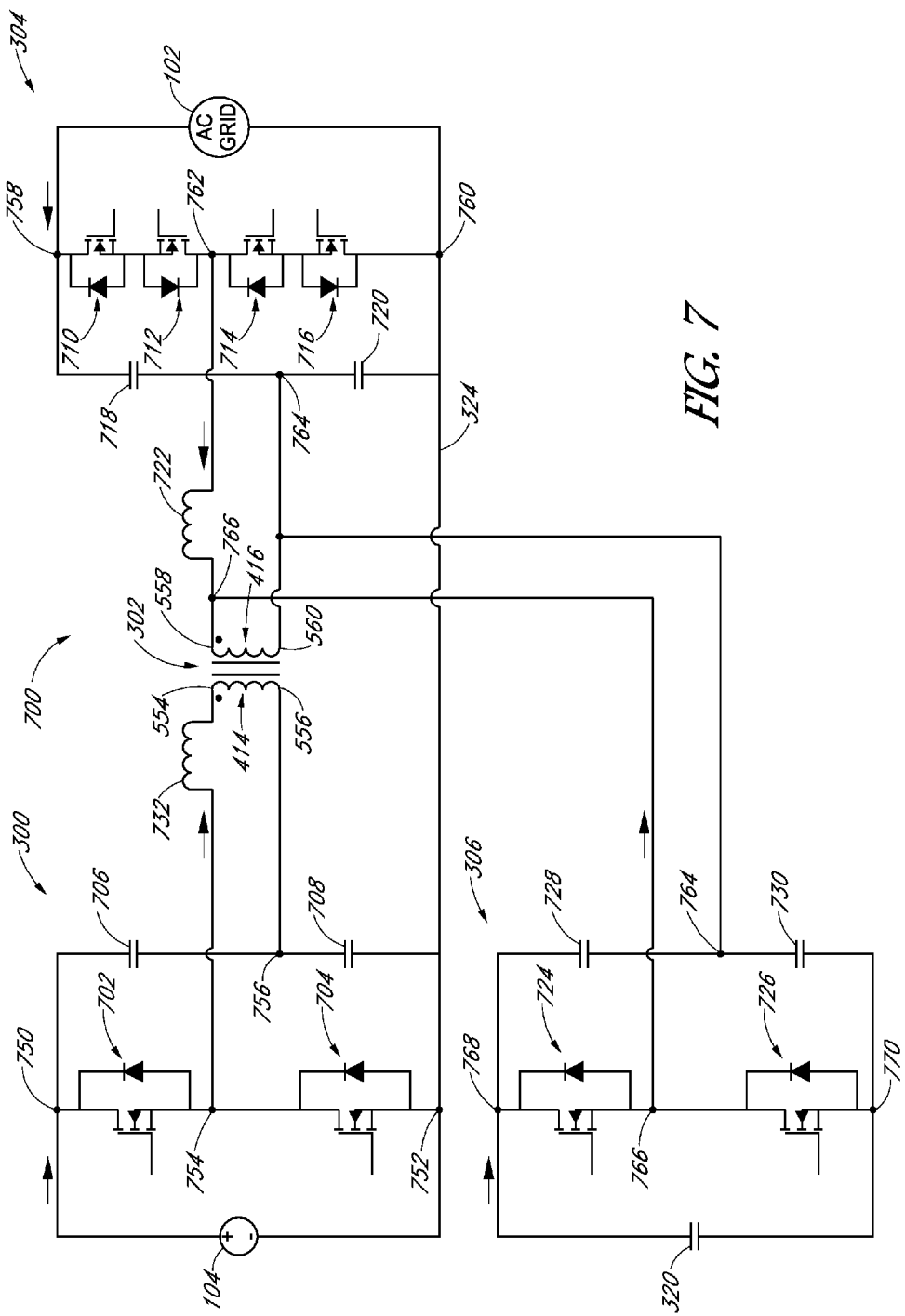
Figure 8:
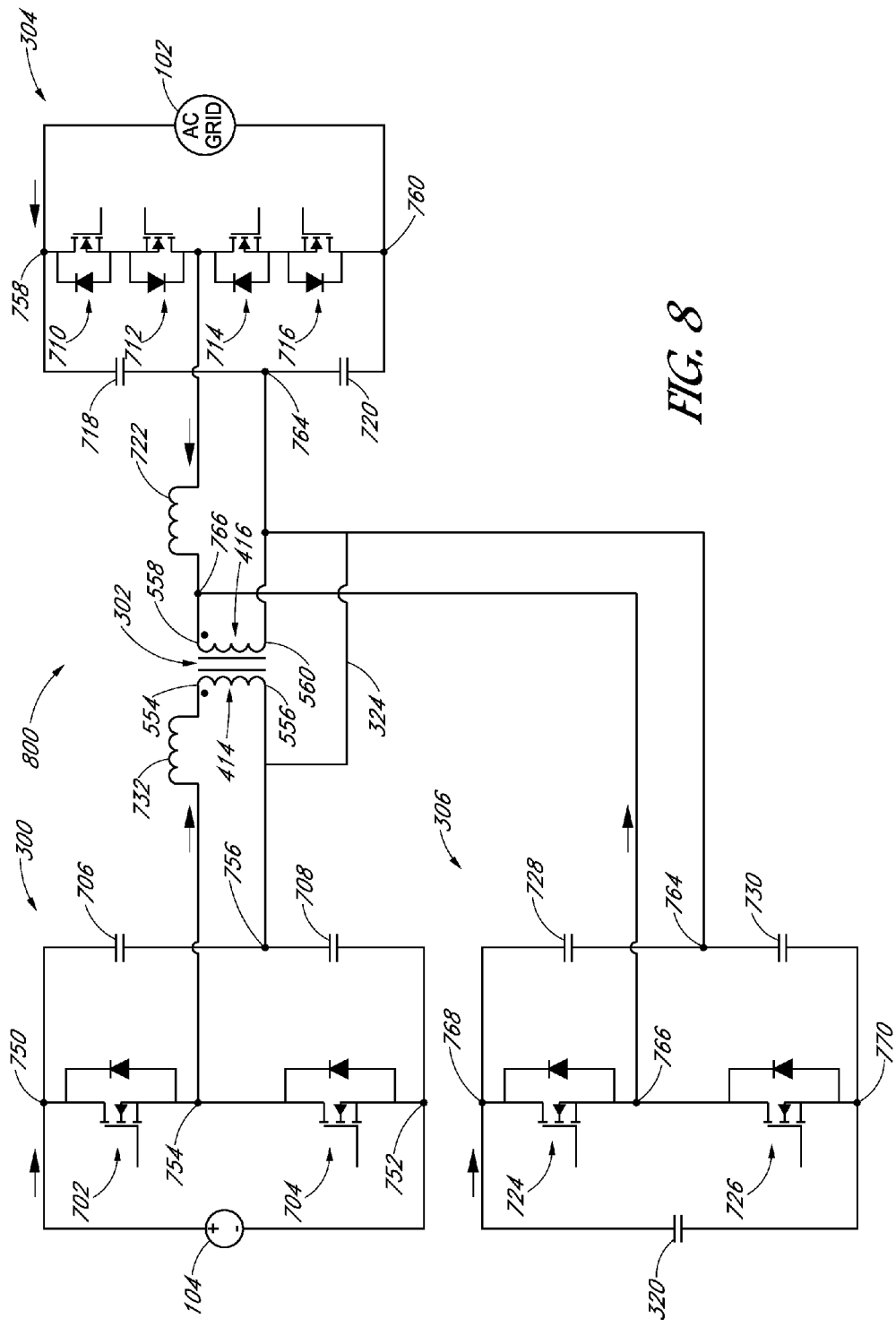
Figure 9:
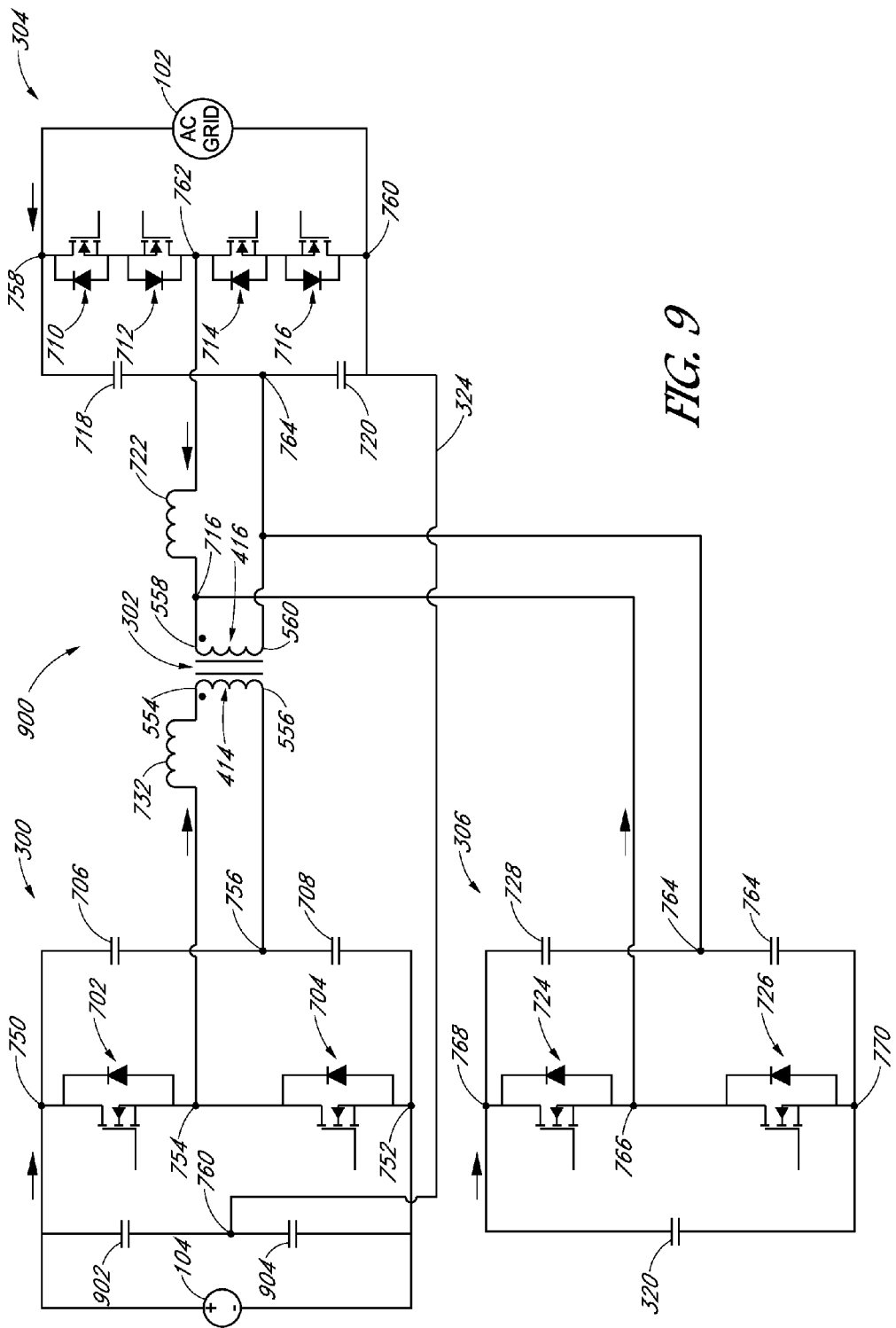

As shown in FIGS. 7-9, the DC-AC inverter 300 of the inverter 700, 800, 900 includes electrical switches 702, 704 and capacitors 706, 708. The cycloconverter 304 includes electrical switches 710, 712, 714, 716, capacitors 718, 720, and an inductor 722. Further, the active filter 306 includes electrical switches 724, 726 and capacitors 728, 730. The active filter 306 further includes the one or more energy storage devices 320, which is illustrated in FIGS. 7-9 as a capacitor. As described above, the DC-AC inverter 300 is electrically coupled to the first winding 414 of the transformer 302 (at terminals 554, 556). Additionally, each of the cycloconverter 304 and the active filter 306 is electrically coupled to the second winding 416 of the transformer 302 (at terminals 558, 560).

The illustrative inverter 700, 800, 900 is electrically coupled to the DC source 104 at electrical connections 750, 752. More specifically, the electrically switch 702 and the capacitor 706 are electrically coupled to the DC source 104 at the electrical connection 750, and the electrical switch 704 and the capacitor 708 are electrically coupled to the DC source 104 at the electrical connection 752. Further, the electrical switches 702, 704 are electrically coupled to one another and to the terminal 554 of the transformer 302 at the electrical connection 754, and the capacitors 706, 708 are electrically coupled to one another and to the terminal 556 of the transformer 302 at the electrical connection 756. Although an inductance 732 is shown as being electrically coupled to the electrical connection 754 and the terminal 554 in FIGS. 7-9, it should be appreciated that the inductance 732 is a leakage inductance from the transformer 302 and, therefore, not a discrete inductor. However, the inductance 732 may alternatively, or additionally, be a result of a discrete inductor in other embodiments.

The inverter 700, 800, 900 is electrically coupled to the AC grid 102 at electrical connections 758, 760. More specifically, a pair of the electrical switches 710, 712 and the capacitor 718 are electrically coupled to the AC grid 102 at the electrical connection 758, and a pair of the electrical switches 714, 716 and the capacitor 720 are electrically coupled to the AC grid 102 at the electrically connection 760. It should be appreciated that each of those pairs of electrical switches is configured with the electrical switches electrically coupled "back-to-back" in series in opposing "directions" to operate, for example, as blocking switches depending on whether the power grid waveform is positive or negative at a given point in time. As shown, the electrical switches 712, 714 are electrically coupled to one another and to the inductor 722 at an electrical connection 762, and the capacitors 718, 720 are electrically coupled to one another and to the terminal 560 of the second winding 416 of the transformer 302 at the electrical connection 764. The inductor 722 is further electrically coupled to the terminal 558 of the second winding 416 of the transformer 302 at the electrical connection 766.

As shown in FIGS. 7-9, the active filter 306 is electrically coupled to the second winding 416 of the transformer 302. In particular, the DC-AC inverter circuit 318 illustratively including a pair of electrical switches 724, 726 and a capacitor divider including the capacitors 728, 730 is electrically coupled to the at least one energy storage devices 320 (represented as a capacitor) at the electrical connections 768, 770. More specifically, the electrical switch 726 and the capacitor 728 are electrically coupled to the energy storage device 320 at the electrical connection 768, and the electrical switch 726 and the capacitor 730 are electrically coupled to the energy storage device 320 at the electrical connection 770. Further, the electrical switches 724, 726 are electrically coupled to one another and to the terminal 558 of the transformer 302 at the electrical connection 766, and the capacitors 728, 730 are electrically coupled to one another and to the terminal 560 of the transformer 302 at the electrical connection 764.

As described above, the use of PWM and/or other semiconductor switching techniques may result in a common mode voltage. The inverter 800 includes a common reference electrical interconnect 324, which serves to limit the common mode voltage to a sinusoidal voltage with a frequency equal to that of the switching frequency. Similarly, the inverters 700, 900 also include a common reference electrical interconnect 324, which allows the inverter 700, 900 to benefit from a predominantly sinusoidal voltage at the switching frequency. More specifically, although switching at the DC-AC inverter 300 generally results in switching common mode dv/dt, the voltage swing may be relatively low (e.g., approximately 60V from the DC source 104)

compared to the high voltage side of the transformer 302 (e.g., the grid voltage of the AC grid 102), thereby allowing a mostly sinusoidal voltage.

More specifically, the illustrative inverter 700 of FIG. 7 includes a common reference electrical interconnect 324 that is electrically coupled to the electrical connection 752 of the DC-AC inverter 300 and the electrical connection 760 of the cycloconverter 304 such that those connections 752, 760 function as the same node or electrical connection. As shown in FIG. 8, the inverter 800 includes a common reference electrical interconnect that is electrically coupled to the electrical connections 756, 764 such that those connections 756, 760 function as the same node or electrical connection. As shown in FIG. 9, the DC-AC inverter 300 of the inverter 900 includes a capacitor divider having capacitors 902, 904. As shown, the capacitor 902 is electrically coupled to the electrical connection 750 and the capacitor 904 is electrically coupled to the electrical connection 752. Further, the capacitors 902, 904 are electrically coupled to one another and to the cycloconverter 304 at an electrical connection 760 via a common reference electrical interconnect 324.

Figure 10:
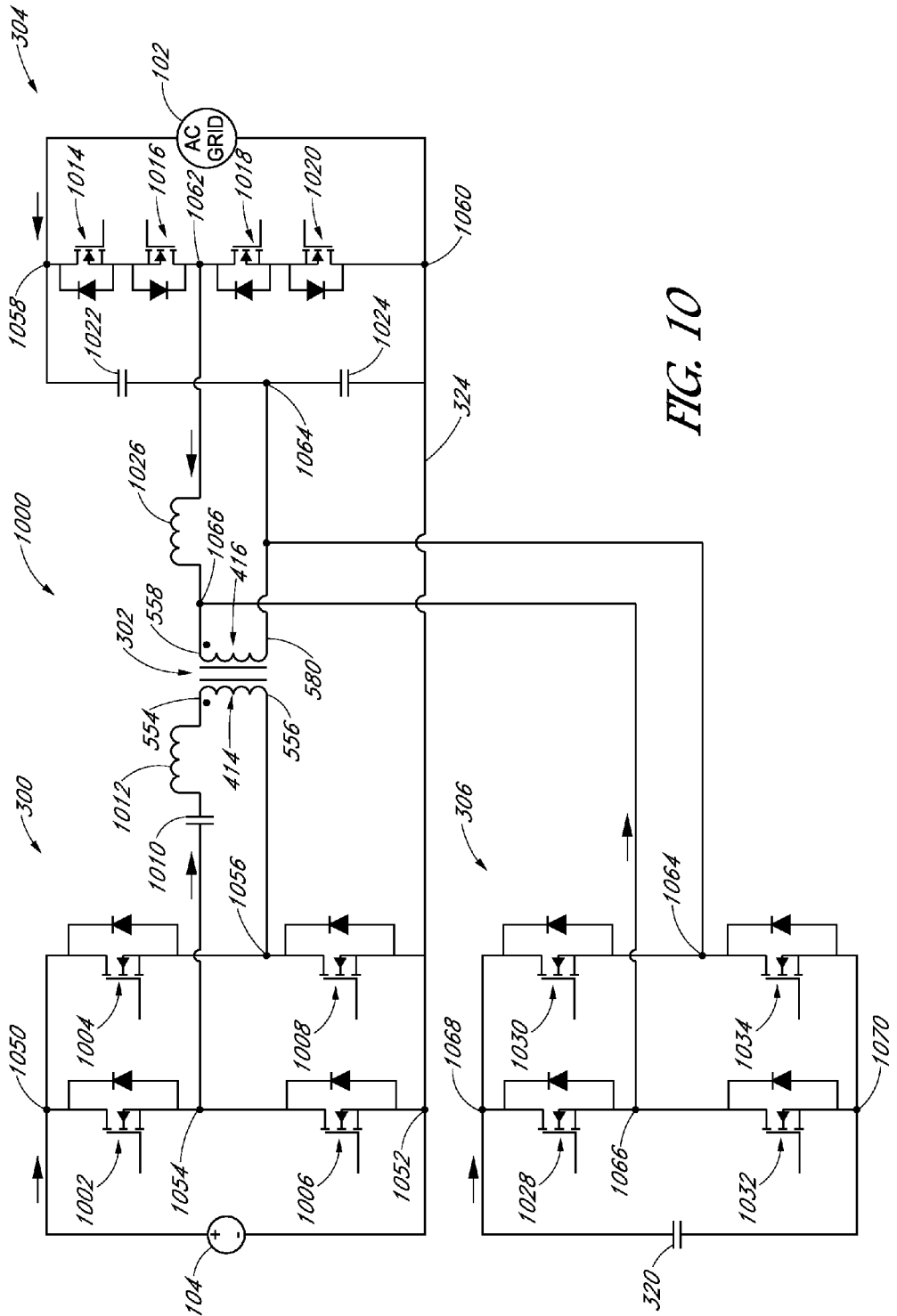
Figure 11:
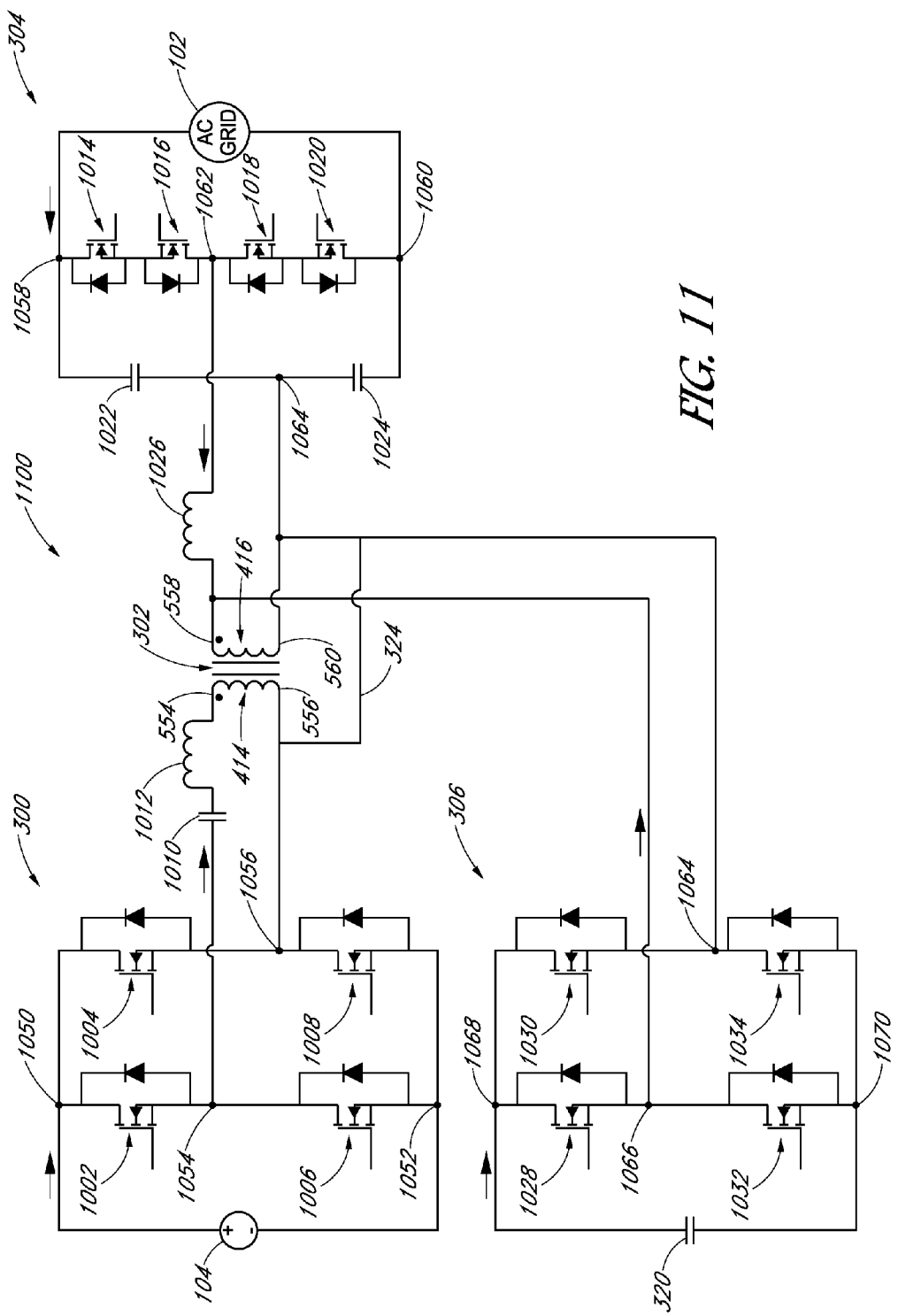
Figure 12:
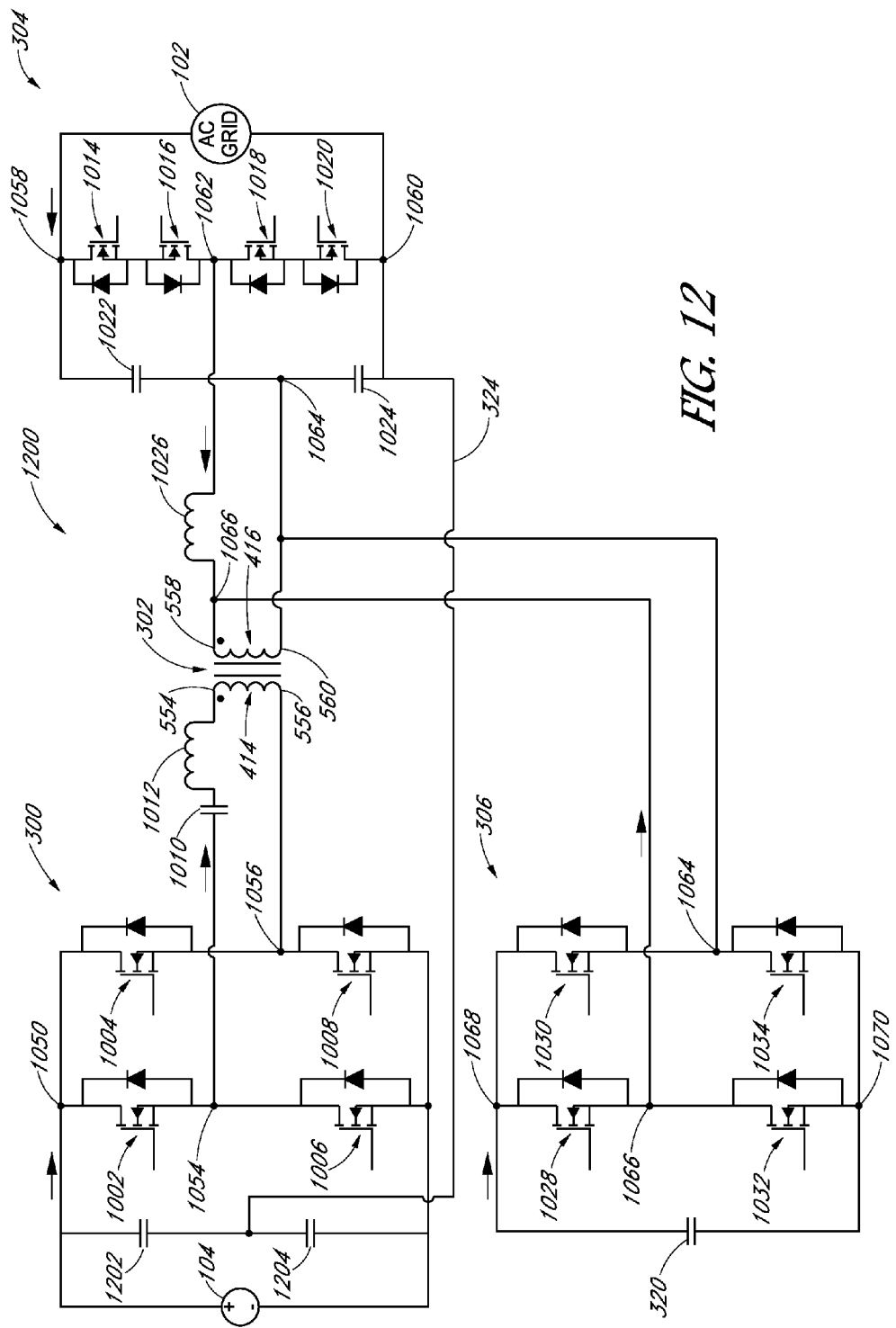

As shown in FIGS. 10-12, the DC-AC inverter 300 of the inverter 1000, 1100, 1200 includes electrical switches 1002, 1004, 1006, 1008, a capacitor 1010, and an inductor 1012. The cycloconverter 304 includes electrical switches 1014, 1016, 1018, 1020, capacitors 1022, 1024, and an inductor 1026. Further, the active filter 306 includes electrical switches 1028, 1030, 1032, 1034 and the one or more energy storage devices 320, which is illustrated in FIGS. 10-12 as a capacitor. As described above, the DC-AC inverter 300 is electrically coupled to the first winding 414 of the transformer 302 (at terminals 554, 556). Additionally, each of the cycloconverter 304 and the active filter 306 is electrically coupled to the second winding 416 of the transformer 302 (at terminals 558, 560).

The illustrative inverter 1000, 1100, 1200 is electrically coupled to the DC source 104 at electrical connections 1050, 1052. More specifically, the electrical switches 1002, 1004 are electrically coupled to the DC source 104 at the electrical connection 1050, and the electrical switches 1006, 1008 are electrically coupled to the DC source 104 at the electrical connection 1052. Further, the electrical switches 1002, 1006 are electrically coupled to one another and to the capacitor 1010 at the electrical connection 1054, and the electrical switches 1004, 1008 are electrically coupled to one another and to the terminal 556 of the transformer 302 at the electrical connection 1056. Additionally, the inductance 1012 is electrically coupled to the capacitor 101 and the terminal 554 of the transformer 302 such that the capacitor 1010 and the inductance 1012 are electrically wired in parallel between the electrical connection 1054 and the terminal 554. It should be appreciated that, depending on the particular embodiment, the inductance 1012 may be representative of a discrete inductor and/or a leakage inductance from the transformer 302.

The inverter 1000, 1100, 1200 is electrically coupled to the AC grid 102 at electrical connections 1058, 1060. More specifically, a pair of the electrical switches 1014, 1016 and the capacitor 1022 are electrically coupled to the AC grid 102 at the electrical connection 1058, and a pair of the electrical switches 1018, 1020 and the capacitor 1024 are electrically coupled to the AC grid 102 at the electrically connection 1060. It should be appreciated that each of those pairs of electrical switches is configured with the electrical switches electrically coupled "back-to-back" in series in opposing "directions" to operate, for example, as blocking switches depending on whether the power grid waveform is positive or negative at a given point in time. As shown, the electrical switches 1016, 1018 are electrically coupled to one another and to the inductor 1026 at an electrical connection 1062, and the capacitors 1022, 1024 are electrically coupled to one another and to the terminal 560 of the second winding 416 of the transformer 302 at the electrical connection 1064. The inductor 1026 is further electrically coupled to the terminal 558 of the second winding 416 of the transformer 302 at the electrical connection 1066.

As shown in FIGS. 10-12, the active filter 306 is electrically coupled to the second winding 416 of the transformer 302. In particular, the DC-AC inverter circuit 318 illustratively including a set of electrical switches 1028, 1030, 1032, 1034 is electrically coupled to the at least one energy storage devices 320 (represented as a capacitor) at the electrical connections 1068, 1070. More specifically, the electrical switches 1028, 1030 are electrically coupled to the energy storage device 320 at the electrical connection 1068, and the electrical switches 1032, 1034 are electrically coupled to the energy storage device 320 at the electrical connection 1070. Further, the electrical switches 1028, 1032 are electrically coupled to one another and to the terminal 558 of the transformer 302 at the electrical connection 1066, and the electrical switches 1030, 1034 are electrically coupled to one another and to the terminal 560 of the transformer 302 at the electrical connection 1064.

As shown, the illustrative inverter 1000 of FIG. 10 includes a common reference electrical interconnect 324 that is electrically coupled to the electrical connection 1052 of the DC-AC inverter 300 and the electrical connection 1060 of the cycloconverter 304 such that those connections 1052, 1060 function as the same node or electrical connection. As shown in FIG. 11, the inverter 1100 includes a common reference electrical interconnect that is electrically coupled to the electrical connections 1056, 1064 such that those connections 1056, 1064 function as the same node or electrical connection. As shown in FIG. 12, the DC-AC inverter 300 of the inverter 1200 includes a capacitor divider having capacitors 1202, 1204. As shown, the capacitor 1202 is electrically coupled to the electrical connection 1050 and the capacitor 1204 is electrically coupled to the electrical connection 1052. Further, the capacitors 1202, 1204 are electrically coupled to one another and to the cycloconverter 304 at an electrical connection 1060 via a common reference electrical interconnect 324.

Each of the electrical switches described herein is a MOSFET in the illustrative embodiments; however, other types of transistors or electrical switches may be used in other embodiments. In some MOSFETs, the source metallization may connect N and P doped regions on the top of the FET structure, forming a diode between the drain and the source of the MOSFET, which is represented as body diodes for each of the corresponding electrical switches. It should be appreciated that, in some embodiments, the inverter 106 may utilize one or more other types of transistors (e.g., bipolar junction transistors (BJT), insulated-gate bipolar transistors (IGBT), etc.) or thyristors.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. An inverter for converting an input direct current (DC) waveform from a DC source to an output alternating current (AC) waveform for delivery to an AC grid, the inverter comprising:
   a three-winding transformer that includes a first winding, a second winding, and a third winding;
   a DC-AC inverter electrically coupled to the first winding of the transformer, wherein the DC-AC inverter is adapted to convert the input DC waveform to an AC waveform delivered to the transformer at the first winding;
   a cycloconverter electrically coupled to the second winding of the transformer, wherein the cycloconverter is adapted to convert an AC waveform received at the second winding of the transformer to the output AC waveform having a grid frequency of the AC grid; and
   an active filter electrically coupled to the third winding of the transformer, wherein the active filter is adapted to sink and source power with one or more energy storage devices based on an instantaneous mismatch in power between the DC source and the AC grid,
   wherein each of the DC-AC inverter, the cycloconverter, and the active filter is electrically coupled to a common reference electrical interconnect.

2. The inverter of claim 1, wherein the DC-AC inverter comprises a half-bridge inverter circuit and a capacitor divider electrically coupled with the half-bridge inverter circuit.

3. The inverter of claim 2, wherein the first winding includes a first terminal and a second terminal;
   wherein the half-bridge inverter circuit comprises a first electrical switch electrically coupled to a second electrical switch at a first node;
   wherein the capacitor divider comprises a first capacitor electrically coupled to a second capacitor and the first terminal at a second node; and
   wherein the DC-AC inverter comprises an inductor electrically coupled in series to the second terminal and the first node.

4. The inverter of claim 3, wherein the DC-AC inverter is electrically coupled to the common reference electrical interconnect at the second node.

5. The inverter of claim 1, wherein the cycloconverter comprises a set of electrical switches and a capacitor divider electrically coupled with the set of electrical switches.

6. The inverter of claim 5, wherein the second winding includes a first terminal and a second terminal;
   wherein the set of electrical switches comprises a first subset of electrical switches electrically coupled to a second subset of electrical switches at a first node;
   wherein the capacitor divider comprises a first capacitor electrically coupled to a second capacitor and the first terminal at a second node; and
   wherein the cycloconverter comprises an inductor electrically coupled in series to the second terminal and the first node.

7. The inverter of claim 6, wherein the cycloconverter is electrically coupled to the common reference electrical interconnect at the second node.

8. The inverter of claim 6, wherein each of the first subset of electrical switches and the second subset of electrical switches consists of a pair of blocking switches electrically coupled in series.

9. The inverter of claim 1, wherein the active filter comprises at least one energy storage device, a half-bridge switching circuit, and a capacitor divider electrically coupled to the at least one energy storage device and the half-bridge switching circuit.

10. The inverter of claim 9, wherein the third winding includes a first terminal and a second terminal;
    wherein the half-bridge switching circuit comprises a first electrical switch electrically coupled to a second electrical switch and the first terminal at a first node; and
    wherein the capacitor divider comprises a first capacitor electrically coupled to a second capacitor and the second terminal at a second node.

11. The inverter of claim 10, wherein the active filter is electrically coupled to the common reference electrical interconnect at the second node.

12. An inverter for converting an input direct current (DC) waveform from a DC source to an output alternating current (AC) waveform for delivery to an AC grid, the inverter comprising:
    a transformer that includes a first winding and a second winding;
    a DC-AC inverter electrically coupled to the first winding of the transformer, wherein the DC-AC inverter is adapted to convert the DC waveform to an AC waveform delivered to the transformer at the first winding;
    a cycloconverter electrically coupled to the second winding of the transformer via a first connection and to the DC-AC inverter via a common reference electrical interconnect, wherein the cycloconverter is adapted to convert an AC waveform received at the second winding of the transformer to the output AC waveform having a grid frequency of the AC grid; and
    an active filter electrically coupled to the second winding of the transformer, wherein the active filter is adapted to sink and source power with one or more energy storage devices based on an instantaneous mismatch in power between the DC source and the AC grid.

13. The inverter of claim 12, wherein the cycloconverter comprises a set of electrical switches and a capacitor divider electrically coupled with the set of electrical switches.

14. The inverter of claim 13, wherein the second winding includes a first terminal and a second terminal;
    wherein the set of electrical switches comprises a first subset of electrical switches electrically coupled to a second subset of electrical switches at a first node;
    wherein the capacitor divider comprises a first capacitor electrically coupled to a second capacitor and the first terminal at a second node; and
    wherein the cycloconverter comprises an inductor electrically coupled in series to the second terminal and the first node.

15. The inverter of claim 14, wherein the active filter comprises at least one energy storage device, a half-bridge switching circuit, and a second capacitor divider electrically coupled to the at least one energy storage device and the half-bridge switching circuit.

16. The inverter of claim 15, wherein the half-bridge switching circuit comprises a first electrical switch and a second electrical switch electrically coupled to the inductor and the second terminal at a common node; and
    wherein the second capacitor divider comprises a third capacitor and a fourth capacitor electrically coupled to the first terminal at the second node.

17. An inverter for converting an input direct current (DC) waveform from a DC source to an output alternating current (AC) waveform for delivery to an AC grid, the inverter comprising:

a controller having a processor and a memory;

a transformer that includes a first winding and a second winding;

a DC-AC inverter electrically coupled to the first winding of the transformer, wherein the DC-AC inverter is adapted to converter the DC waveform to an AC waveform delivered to the transformer at the first winding;

a cycloconverter electrically coupled to the second winding of the transformer and to the DC-AC inverter via a common reference electrical interconnect, wherein the cycloconverter is adapted to convert an AC waveform received at the second winding of the transformer to the output AC waveform having a grid frequency of the AC grid; and an active filter electrically coupled to the second winding of the transformer and comprising a plurality of electrical switches and one or more energy storage devices, wherein the controller is adapted to control the switching cycles of the plurality of electrical switches of the active filter to sink and source power with the one or more energy storage devices based on an instantaneous mismatch in power between the DC source and the AC grid.

18. The inverter of claim 17, wherein the controller is adapted to control the switching cycles of the plurality of electrical switches using zero-voltage switching.

19. The inverter of claim 17, wherein the DC source comprises a photovoltaic module.

* * * * *